Oct. 31, 1967 C. S. JACKOWSKI 3,350,003
FLUID CONTROLLED ACTUATING MECHANISM
Filed April 29, 1965 2 Sheets-Sheet 1

INVENTOR
CHARLES S. JACKOWSKI
BY K. P. Johnson
ATTORNEY

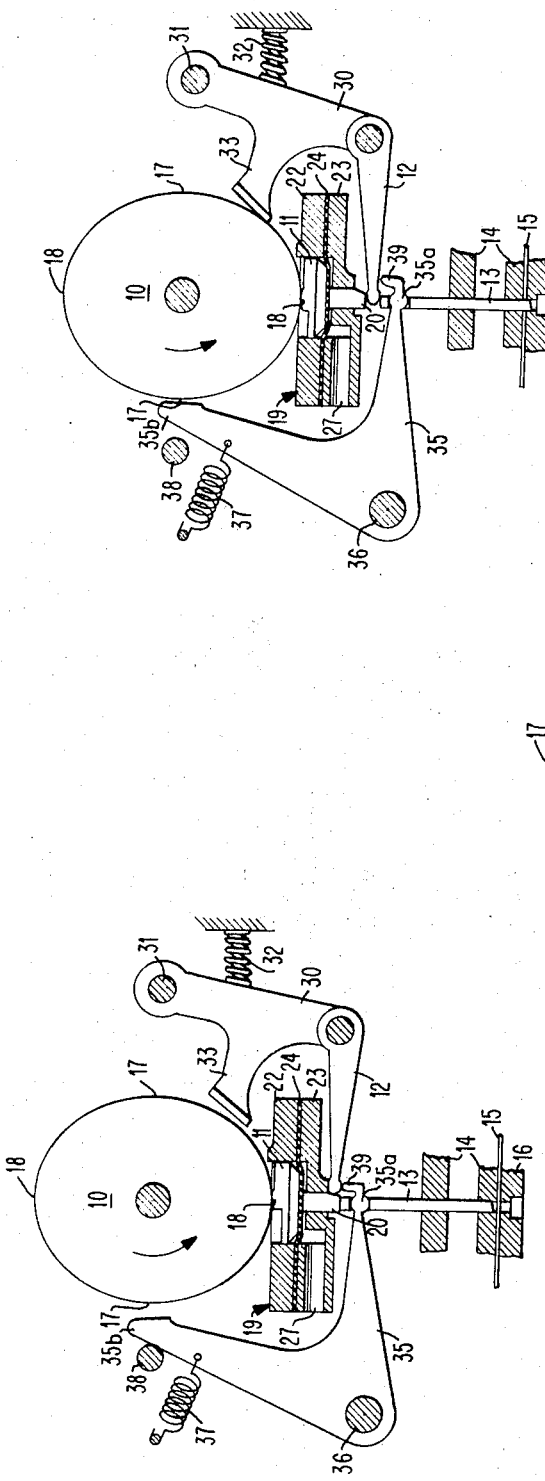

United States Patent Office 3,350,003
Patented Oct. 31, 1967

3,350,003
FLUID CONTROLLED ACTUATING MECHANISM
Charles S. Jackowski, Endicott, N.Y., assignor to International Business Machines Corporation, Armonk, N.Y., a corporation of New York
Filed Apr. 29, 1965, Ser. No. 451,900
17 Claims. (Cl. 234—107)

This invention relates generally to selective control apparatus for mechanisms and more particularly to such apparatus operable by pulses of pressurized fluid.

The selective control of low or high speed mechanisms, such as document punches, printers, recorders, etc., has generally been accomplished heretofore by electrical signals operating electromagnets which, in turn, move interposing elements between a driving and a driven member. There has developed, however, a need for actuating mechanisms controlled by fluid pressure signals because of current efforts toward the design and construction of fluid-controlled apparatus and logic systems. When a system is designed to be operated entirely by pressurized fluid, it becomes costly to control such systems with conventional apparatus because of the necessity of changing fluid signals to electrical signals or vice versa. A change from a fluid to an electrical mode also requires the use of additional components which are a possible source of failure and decrease the reliability of the apparatus. It thus becomes desirable to provide apparatus which eliminates the necessity of a translation interface between electrical and fluid components.

Fluid-operated mechanisms such as punches have previously been used to achieve document recording, but these devices have nearly all required a high pressure fluid source to provide the force required to perforate a record member. These devices utilize the direct force of relatively high pressure fluid to push the punch through the record. It can be seen that such an arrangement requires correspondingly heavy duty components, such as valves and ducts, to control and direct the force of the fluid. Other devices have been constructed using lower pressures, but these require a change in the direction of fluid flow within the selection chamber and electromagnetic valve control. The development of low pressure fluid logic elements, however, can provide an inexpensive, compact and reliable control system by which the low pressure fluid outputs are directly utilized in the construction of economical and reliable data input/output apparatus.

Accordingly, it is a primary object of this invention to provide fluid-actuated mechanism responsive to fluid pressure signals for selectively initiating the operation of direct mechanical linkage.

Another object of this invention is to provide actuating mechanism which is reliably controlled by the low pressure pulses of fluid such as those found in fluid logic elements.

Yet another object of this invention is to provide selective control apparatus which can be controlled by low pressure fluid signals to permit the selective engagement of an interposer for transmitting a mechanical driving force to a driven member.

Another important object of this invention is to provide fluid-actuated mechanical control apparatus which utilizes unidirectional flow of fluid pulses for control purposes.

In accordance with the foregoing objects, the invention provides a rotatable driving means which moves a fluid control means that is selectively engageable with the driving means in response to the fluid pressure signals. An interposer means is biased for insertion between the control means and an actuated member which may be a punch element. When the control means responds to supplied fluid signals, which are changes in the pressure, the interposer means is inserted adjacent the control means to transmit subsequent motion of the control means by the driving means directly to the movable member. Means are further provided to utilize the motion of the driving means for returning the element and interposer means to retracted positions ready for subsequent operation.

The provision of fluid-actuated control means permits the selective arrangement of a direct mechanical coupling from a power source to the element which is to ultimately receive the transmitted force. The arrangement thus minimizes lost motion and permits the use of fluid-actuated members in both low and relatively high speed devices. The device further advantageously eliminates complicated valves and bidirectional fluid flow heretofore required in actuating devices which severely limited the operational speed.

The foregoing and other objects, features and advantages of the invention will be apparent from the following more particular description of a preferred embodiment of the invention, as illustrated in the accompanying drawings wherein:

FIGURES 2a–2c are schematic elevational views of the mechanism shown in FIG. 1 as it appears at varying times in a cycle of operation;

Figure 1:
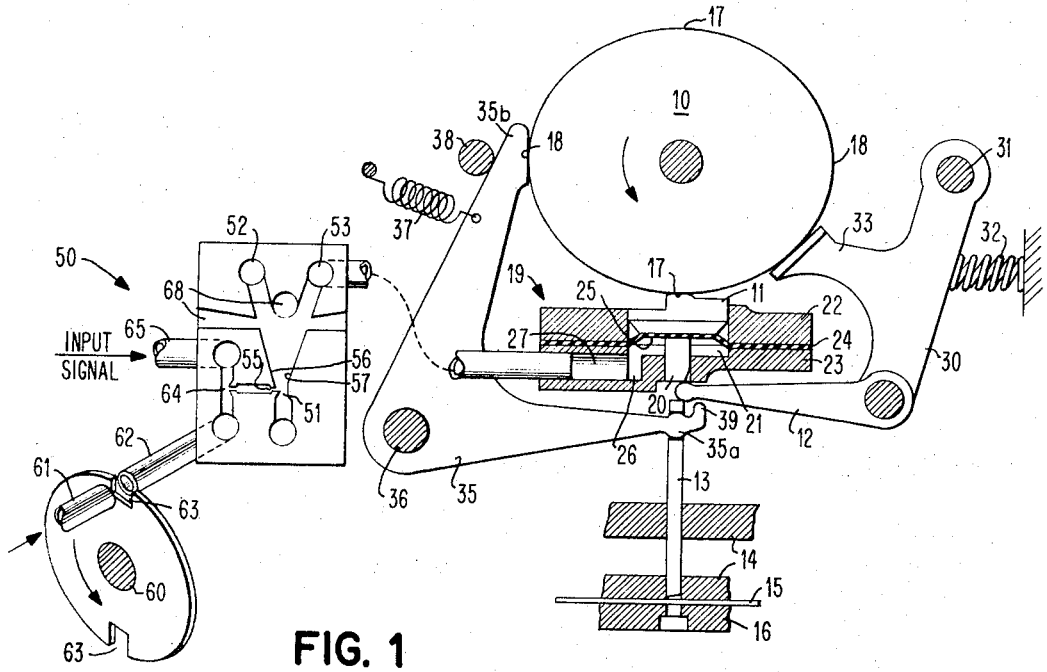
FIGURE 1 is a schematic elevation view of a punching deivce embodying the invention shown in conjunction with apparatus for producing fluid control signals.

Referring to FIG. 1, the mechanism of the invention generally comprises an elliptical cam 10, reciprocable control piston or follower 11, interposer 12, and movable element 13, such as a punch, which is to be driven through parallel guide blocks 14, document 15 and into mating die 16. The cam is fixed on a shaft which is continuously rotated in the direction of the arrow. The cam periphery is divided into alternate high and low portions 17 and 18, respectively. Cam follower 11 is a piston movable in a cylinder block, indicated generally as 19, and has a depending shank 20. A piston chamber 21 is formed in the stationary block 19 which comprises an upper plate 22 and lower plate 23 suitably secured together with a thin, flexible diaphragm 24 therebetween. The diaphragm may be of polyurethane, rubber or rubberlike material, a few thousandths of an inch thick and is preformed as shown so that portion 25 can be easily flexed up or down to minimize the force required to change its positions. A cutout in the diaphragm permits piston shank 20 to enter a hole in lower plate 23 at the bottom of the piston chamber. The diaphragm is preferably not secured to the bottom surface of the piston but may be secured by a suitable adhesive to minimize leakage and to hold the piston from turning within the chamber if a cylindrical piston is used.

The piston and chamber may be of any desired cross-sectional configuration. The piston shown is of rectangular cross-section to permit closer spacing of adjacent pistons on a common cam. The chamber has a depression 26 which communicates with a channel 27 in the lower plate. Fluid pressure signals are supplied through the channel to the lower portion of the piston chamber to effect a rise of the piston to the position shown when punching is to occur. Although the chamber is shown fitted with a fluid impervious diaphragm, the diaphragm may be dispensed with and piston operated directly by the fluid signals. In this case, the fit between the piston and chamber walls must necessarily be held to close tolerance to prevent an excessive escape of fluid from the chamber.

Interposer 12 is pivotally supported on a follower arm 30 which is, in turn, pivoted on shaft 31. A spring 32 is arranged to continuously urge arm 30 clockwise about pivot 31 so that the follower portion 33 on the arm is forced toward engagement with cam 10. With this arrangement, interposer 12 is urged toward insertion between piston shank 20 and punch element 13. In FIG. 1 the interposer is partially engaged and will be fully inserted as the low portion of cam 10 approaches follower portion 33 of arm 30. Piston 11, however, will be forced downward by the following high cam portion 18 causing shank 20 to push interposer 12 also downward against punch element 13 forcing the punch through guide blocks 14 into document 15 and die plate 16.

The punch element is restored to the upward position by bell crank 35 which is pivoted on shaft 36. The bell crank is continuously urged counterclockwise by yieldable spring 37 and limited by stop 38. Arm 35a of the bell crank engages a slot in the side of punch element 13 so that the arm and punch move together in either direction. Although a return spring 37 is provided for the bell crank, arm 35b also serves as a cam follower engageable with cam 10. In operation the bell crank is actually moved counterclockwise by the high cam portions against arm 35b while the spring only serves to hold the arm against stop 38. This occurs because of the rapid rotation of cam 10 and the inertia of the mechanism which cannot readily be overcome by spring 37. At the extreme end of arm 35a will be seen an upward extending portion 39 which serves as a rest for interposer 12 to hold the end of the interposer in alignment for insertion over punch element 13 in the event that follower piston 11 is urged upward. Whenever interposer 12 is withdrawn by the action of follower portion 33 engaging cam 10 at high portion 18, the interposer moves to the right and rests on arm end 39 in alignment for insertion when the punch mechanism is selected for actuation.

Fluid pressure pulses by which the punching apparatus is controlled may be supplied by any suitable device which can generate a relatively sharp pressure pulse at the frequency required for the punching operation in which the mechanism is used. An example of a device suitable for controlling the mechanism is a device known as a pure fluid jet amplifier, shown generally as 50. These amplifiers are well known and will be described here only briefly.

Fluid is supplied under pressure through nozzle 51 to produce a power stream or jet which can be switched to either of outlets 52 or 53. Adjacent the nozzle 51 on the left side is a control nozzle 55. The control nozzle is close to the power nozzle and substantially normal thereto for directing a fluid stream against the power jet causing deflection of the jet into outlet port 53. Wall 56 adjacent control nozzle 55 is set back from the wall of the nozzle 51 so that the power stream will initially attach itself to wall 56 when started and flow from port 52. The stream will remain attached to the wall until a control stream from nozzle 55 occurs. At this time the power stream transfers to outlet port 53 as long as the control stream exists. The opposite wall 57, however, is not set back at nozzle 51 so that the stream will not attach itself when switched. The amplifier is thus monostable wherein the power stream will attempt to flow along wall 56 in the absence of a control stream.

In order to efficiently control and select the time in which the punch is to be actuated, it is preferable to provide a synchronizing pulse with which an input signal can be combined to assure that the fluid amplifier will be switched only at the optimum time. Synchronization is obtained with a slotted disc 59 mounted on shaft 60 which is, in turn, mechanically coupled to the shaft of cam 10 for rotation together. Pressurized fluid, such as air, is continuously supplied in the direction of the arrow to duct 61 and the downstream end of the duct directs the air against the input end of duct 62 whenever a slot 63 occurs in disc 59. With each half revolution of disc 59, a pulse of pressurized fluid is supplied to one input of "AND" duct 64 which is normal to control nozzle 55. The pulse from duct 62, however, is of no effect to the fluid amplifier in the absence of an input signal at the other end of duct 64 via duct 65.

When the fluid pressure is increased by concurrent pulses in both duct 62 and duct 65, however, the pressure in duct 64 increases and is reflected at control nozzle 55 causing the power stream from nozzle 51 to deflect toward wall 57. The power stream will switch to outlet port 53 which is, in turn, connected by a suitable duct to channel 27 in cylinder block 19. At this time pressure in chamber 21 is increased urging the diaphragm portion 25 and piston 11 upward into engagement with the low dwell portion of cam 10. A pulse supplied to duct 65 may, for instance, result from pneumatically sensing a punched hole in another record member. The power stream automatically switches back to its original condition when the control stream from nozzle 55 terminates. A bistable fluid amplifier can be used, if desired, but such an arrangement requires reset pulses from a nozzle opposite control nozzle 55 to return the power stream. Vents 68 are optionally provided to atmosphere to permit the escape of fluid in the event of back-pressure which may overcome the streamwall attachment.

The operation of the punch mechanism is illustrated by FIGS. 2a–2c and FIG. 3. In the absence of any fluid pressure control signal at channel 27, the mechanism remains stationary in the position shown in FIG. 2a with the exception of cam 10 which is continuously rotating. It will be noted that the control piston 11 is down and that interposer 12 is held from engagement by depending shank 20 on the control piston. The side of the shank adjacent the interposer is beveled to provide a surface normal to the direction of force of the interposer so that the interposer is not urged either up or down while in this position.

Figure 3:
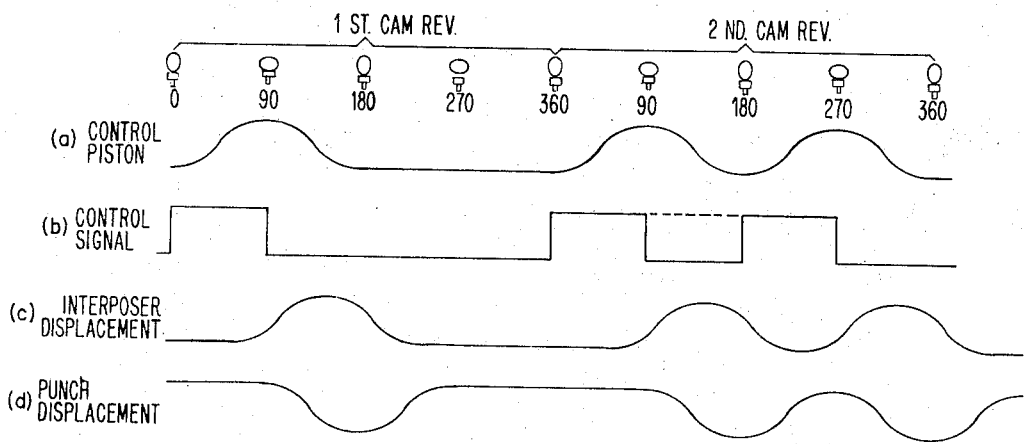
FIGURE 3 is a timing diagram illustrating the relationship of the various elements of the mechanism during oepration.

As seen from the timing diagram in FIG. 3 in conjunction with FIGS. 2a–2c, the control piston rises (curve a) to a maximum height into contact with a low portion 17 of the cam in response to a fluid pressure signal supplied during 0° to 90° (curve b) of the first revolution of cam 10. Although the signal is shown as generated, for 90°, the duration of the pulse may be shortened or lengthened depending upon the fluid pressure, piston area, and operating speed of the punch. As the control piston rises, the opening between the shank 20 and punch element 13 increases so that the interposer starts entry at approximately 70° (curve c) and is only partially inserted at 90° as shown in FIG. 2b. Although the fluid signal terminated at 90°, interposer 12 continues its movement to the left under the urging of spring 32 until approximately 150°. The motion of the interposer is controlled and limited by follower portion 33 acting on the cam periphery.

The control piston starts its downward travel before the interposer reaches its left limit of travel. As the control piston moves down due to the approaching high dwell portion of cam 10, its motion is transmitted through the interposer to the punch element. It will be seen from a comparison of curves c and d that the punch element is approximately ⅝ of the way down when the interposer starts its return toward the right hand and ineffective position. The punch, however, continues downward and reaches maximum displacement at its extended position thereafter at 180° as shown in FIG. 2c. After this time, punch movement is reversed and the interposer continues to be withdrawn. The interposer is timed, by the location of arm 33 relative to the control piston, to be withdrawn prior to the time bell crank 35 and the cam fully retract the punch element. Therefore, no upward movement is transmitted to the control piston in the absence of a fluid pressure signal. The bell crank returns the punch to its upward limit determined by stop 38. FIG. 2c shows spring 37 is effective to return the punch element; however, the cam usually operated the bell crank because of speeds too high for the spring to act, except as a holding force. Thus the structure of FIG. 1 has been selected for one operating cycle to actuate the punch. Because of the symmetrical cam two punch operations are possible with each cam revolution.

The timing diagram for the second revolution of the cam illustrates the apparatus as it responds to two consecutive fluid signals initiated at 360° and 180° into curve b. The two signals have the same effect as a single continuous pulse indicated by the dotted line. The control piston may be steadily forced upward by the fluid pressure, if desired, when each consecutive index position is to be perforated in the record member. At the conclusion of a punch cycle, an indexing operation may be initiated to move the record member 15 to the next index position. The incrementing mechanisms may be operated from cam 10 or by other driving elements synchronized with the rotation of the cam.

Figures 4, 5:
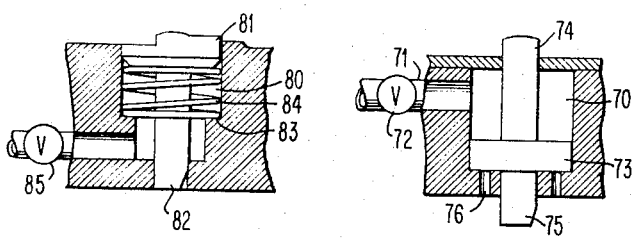
FIGURES 4 and 5 are elevation views of modifications of the piston and chamber shown in FIG. 1.

It will be evident that the invention can be modified for operation by selectively applied vacuum as shown in FIG. 4 or by the release of a vacuum as shown in FIG. 5. In FIG. 4, piston-follower chamber 70 is connected near the top to a source of vacuum through a duct 71 and valve 72. The piston 73 is formed with two extending shanks; the upper shank 74 contacts the cam and the lower shank 75 contacts the interposer. When the punch mechanism is to be engaged, valve 72 is opened to evacuate the chamber above piston 73 causing the piston to rise into engagement with the low cam portion. When the piston is to remain disengaged from the cam, valve 72 is closed. If desirable, a spring may be used to lightly bias the piston downward, and small bleeder holes 76 may be provided to enhance the vacuum attraction.

In FIG. 5, chamber 80 is somewhat longer than that shown in FIG. 1. The piston 81 has a longer depending shank 82 and the chamber is provided with a ledge 83 on which is supported a biasing spring 84 to urge the piston into engagement with the cam. Valve 85 is connected to a vacuum source and when the valve is open, chamber 80 is evacuated under the piston forcing the piston down and overcoming the spring bias. When the mechanism is to be operated, the vacuum is terminated allowing spring 84 to raise the piston so that the interposer moves to its effective position.

It will be noted that the fluid-controlled selection apparatus shown is not limited to punching but can easily be adapted for the selective transmission of motion by replacing the punch element with a link, lever, print element or the like. The invention, by its arrangement, readily lends itself to incorporation in machines requiring a plurality of adjacent mechanisms. Furthermore, the piston need not be of rectangular configuration but may be of different cross-section, and the remaining components do not require a heavy construction for most machine applications.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus comprising, in combination:
   an element movable from a retracted to an extended position;
   an operating member for said element;
   movable interposer means in a first position biased for movement to a second position to render said member operable, said interposer means being biased toward said second position; and
   fluid-actuated selector means for holding said interposer means in said first position and responsive to a fluid pressure signal for releasing said interposer means to said second position whereby said element is moved from said retracted to said extended position.

2. Apparatus as described in claim 1 further including means for selectively supplying a fluid pressure signal to said selector means.

3. Apparatus for selectively imparting motion to a movable member comprising:
   a rotating cam having high and low portions;
   a cam follower adjacent said cam transferable from an extended to a retracted position in response to a fluid pressure signal and from a retracted to an extended position by said high cam portion;
   interposer means biased for insertion between said follower and said member when said follower is in said retracted position for transmitting the motion of said follower to said member; and
   means for selectively generating a said signal by creating a change in fluid pressure at said follower to move said follower to said retracted position against said low cam portion.

4. Actuating apparatus comprising, in combination:
   an element movable along a path;
   rotating cam means having first and second portions;
   cam follower means engageable with said cam at said first portion in response to a fluid pressure pulse supplied thereto for movement by said second portion;
   means for selectively supplying said pulses of fluid to said cam follower means by creating a change in fluid pressure; and
   interposer means biased for insertion between said follower and said element when said follower engages said first portion for transmitting the motion of said follower to said element.

5. Apparatus as described in claim 4 wherein said interposer means includes a member thereon engageable by said cam means for restoring said interposer means to said first position.

6. Apparatus of the class described comprising:
   an element movable in opposite directions along a fixed path;
   cyclically operable cam means having first and second portions;
   follower means for said cam engageable in a retracted position with said first portion and movable therefrom to an extended position by said second portion;
   means forming a chamber for said follower means for applying fluid pressure to move said follower into engagement with said first portion; and
   interposer means being biased for insertion from an ineffective position to a position between said follower in said retracted position and said element for transmitting the follower motion to move said element in one direction.

7. Apparatus as described in claim 6 further including means for withdrawing said interposer means to said ineffective position.

8. Apparatus as described in claim 6 wherein said interposer means includes a member engageable by said cam and movable thereby for withdrawing said interposer means to said ineffective position.

9. Apparatus as described in claim 6 further comprising means for withdrawing said interposer means to said ineffective position and means for moving said element in a direction opposite to said one direction.

10. Apparatus of the class described comprising:
    a driven element movable along a fixed path;
    rotary cam means having first and second portions;
    means forming a chamber for receiving pressurized fluid therein;
    piston means slidable in said chamber and having a pair of end portions extending in opposite directions, said piston means being responsive to said pressurized fluid to move in one direction to engage one said end with said first portion so that said piston means is moved in said opposite direction by said second portion; and interposer means being biased for insertion between said element and the other of said piston end portions for transmitting said opposite motion of said piston means to said element.

11. Apparatus as described in claim 10 wherein said means forming a chamber includes an expansible diaphragm for providing a seal for said pressurized fluid.

12. Apparatus for marking a record comprising, in combination:
a marking element movable from a retracted to a record marking position;
driving means for said element including a cam and engageable follower therefor responsive to a change in fluid pressure for moving from an ineffective to effective position to have motion imparted thereto;
interposer means biased for insertion intermediate said follower and said element when said follower moves to said effective position for transmitting said imparted motion to drive said element to said marking position; and
means for providing a change in fluid pressure at said driving means to engage said follower.

13. Apparatus as described in claim 12 further including:
means operable by said cam for withdrawing said interposer means from said follower and said element; and
means for restoring said element to said retracted position from said marking position.

14. Apparatus for marking a record member comprising, in combination:
a marking element movable from a retracted to a record marking position;
driving means for said element including a cam and engageable follower therefor responsive to a fluid pressure pulse for moving from an ineffective to effective position for having motion imparted thereto;
interposer means biased for insertion intermediate said follower and said element when said follower is in said effective position for transmitting said imparted motion to drive said element to said marking position; and
means for providing a said pressure pulse of fluid to move said follower to said effective position.

15. Apparatus as described in claim 14 wherein said pulse providing means includes means synchronized with said driving means for providing said pressure pulse at a predetermined time.

16. Actuating apparatus comprising, in combination:
a record marking element movable along a fixed path;
rotating cam means having first and second portions;
means forming a chamber for receiving pressurized fluid therein;
piston means slidable in said chamber and having a pair of end portions extending in opposite directions, said piston means being responsive to said pressurized fluid to move in one direction to engage one said end portion with said first cam portion so that said piston means is moved in said opposite direction by said second cam portion;
interposer means biased for insertion between said element and the other of said piston end portions for transmitting said opposite motion of said piston means to said element; and
means synchronized with said cam means for applying said pressurized fluid to said chamber at a predetermined time relative to said cam rotation.

17. Perforating apparatus comprising, in combination:
a punch element movable from a retracted to a punching position;
rotating cam means for actuating said punch including an engageable cam follower responsive to a pressure pulse of fluid for moving from an ineffective to effective position for transmitting cam motion;
interposer means biased for insertion between said follower and said punch element when said follower is in said effective position for transferring said cam motion to move said punch element to said punching position; and
means for applying a pressurized pulse of fluid to said follower.

References Cited

UNITED STATES PATENTS 570,352  1/1896  Tracy _____ 234—87

WILLIAM W. DYER, Jr., *Primary Examiner.*

GERALD A. DOST, *Examiner.*